United States Patent
Desgagné et al.

[19]

[11] Patent Number: 5,963,865
[45] Date of Patent: Oct. 5, 1999

[54] TRAFFIC CHANNEL ASSIGNMENT IN A CELLULAR TELEPHONE SYSTEM USING AN UPLINK INTERFERENCE DRIVEN FREQUENCY PACKING METHOD

[75] Inventors: Michel Desgagné, St. Hubert, Canada; Arne Simonsson, Gammelstad; Patrik Karlsson, Alta, both of Sweden; Mairead Nagle, Dublin, Ireland

[73] Assignee: Telefonaktiebolaget LM Ericsson, Sweden

[21] Appl. No.: 08/977,083

[22] Filed: Nov. 24, 1997

[51] Int. Cl.$^6$ ..................................................... H04Q 7/00
[52] U.S. Cl. ......................... 455/450; 455/509; 455/513; 455/62; 370/329; 370/442
[58] Field of Search ........................... 455/422, 450–453, 455/455, 507, 509, 512, 513–514, 516–517, 524–525, 62, 161.1–161.3, 166.1–166.2; 370/322, 329, 330, 337, 347, 442

[56] References Cited

U.S. PATENT DOCUMENTS

| | | |
|---|---|---|
| 4,485,486 | 11/1984 | Webb . |
| 4,794,635 | 12/1988 | Hess . |
| 4,866,710 | 9/1989 | Schaeffer . |
| 5,157,709 | 10/1992 | Ohteru . |
| 5,280,630 | 1/1994 | Wang . |
| 5,287,544 | 2/1994 | Menich et al. . |
| 5,295,138 | 3/1994 | Greenberg et al. ....................... 455/62 |
| 5,309,503 | 5/1994 | Bruckert . |
| 5,355,522 | 10/1994 | Demange . |
| 5,428,815 | 6/1995 | Grube . |
| 5,491,837 | 2/1996 | Haartsen . |
| 5,551,064 | 8/1996 | Nobbe et al. . |
| 5,666,651 | 9/1997 | Wang ....................................... 455/450 |
| 5,752,192 | 5/1998 | Hamabe .................................. 455/62 |

FOREIGN PATENT DOCUMENTS

0 329 997  3/1989  European Pat. Off. .

*Primary Examiner*—Dori H. To
*Attorney, Agent, or Firm*—Jenkens & Gilchrist, P.C.

[57] ABSTRACT

Each base station in a cellular telephone system includes a signal strength measurement device operable to tune to and make signal strength measurements on not only the frequencies allocated to other cells, but also on its own allocated frequencies. Measurements are made by the device on those of its own frequencies having idle traffic channels to obtain an indication of injected uplink interference. An interference penalty is then assessed against the measured uplink interference for those frequencies having more than a threshold number of idle traffic channels. The adjusted measurements for the frequencies allocated to the cell are then sorted in relative order of idle traffic channel (adjusted) measured uplink interference from a least (adjusted) interfered frequency to a most (adjusted) interfered frequency. An idle traffic channel is then selected for assignment at either call set-up or hand-off from the least (adjusted) interfered frequency.

32 Claims, 2 Drawing Sheets

TRAFFIC CHANNEL ASSIGNMENT IN A CELLULAR TELEPHONE SYSTEM USING AN UPLINK INTERFERENCE DRIVEN FREQUENCY PACKING METHOD

BACKGROUND OF THE INVENTION

1. Technical Field of the Invention

The present invention relates to cellular telephone systems and, in particular, to a method and apparatus for selection and assignment of a traffic channel during call set-up and hand-off by evaluating uplink signal strength measurements combined with frequency packing analysis.

2. Description of Related Art

Cellular telephone systems divide a large service area into a number of smaller discrete geographical areas called "cells" each typically ranging in size from about one-half to about twenty kilometers in diameter. Each cell is contiguous with multiple adjacent cells to provide continuous coverage throughout the service area. A base station including a plurality of transceivers capable of operating independently on different radio frequencies is provided for each of the cells. Via the transceivers, the base stations engage in simultaneous communications with plural mobile stations operating within the area of the associated cell. The base stations further communicate via data links (and voice trunks) with a central control station, commonly referred to as a mobile switching center, which functions to selectively connect telephone calls to and from the mobile stations through the base stations and, in general, control operation of the system.

Each cell is allocated the use of a predetermined set of frequencies, wherein each frequency comprises a physical channel supporting a plurality of logical channels (i.e., time slots) therein. The availability of multiple frequencies per cell, with multiple logical channels per frequency, permits base stations to simultaneously handle many telephone conversations with many mobile stations. The frequencies allocated to a cell are preferably spaced apart across the frequency spectrum of the cellular band. This serves to minimize the instances of adjacent channel interference.

Because only a limited number of frequencies are available in the cellular band, allocation of the same frequencies is repeated (i.e., reused) in other cells in a distant part of large service areas with many cells. No adjacent cells, however, are assigned the same frequency. Furthermore, the power levels of the signal transmissions on any given frequency are limited in strength. The foregoing precautions serve to minimize the likelihood of co-channel interference caused by reuse of that same frequency in a distant cell.

In spite of the precautions taken by service providers, it is known that instances of adjacent channel and co-channel interference do occur. This interference often adversely affects system operation by, for example, degrading voice or data quality on the traffic channels or interfering with the transmission and reception of control signals on the control channels.

The mobile switching center functions to dynamically assign the traffic channels available in any one cell among the plurality of mobile stations located within the cell area that desire communications. In this regard, the traffic channels comprise time slots in digital time division multiple access (TDMA) formatted frequencies which are allocated to the cell. Commands that assign for mobile station use a certain digital traffic channel assigned to a given cell are transmitted from the mobile switching center to the base station for that cell. The commands are then relayed by the base station to the certain mobile station over one of the channels to direct mobile station selection of the assigned traffic channel for handling the call.

Assignment by the mobile switching center of a particular digital traffic channel in a cell to a particular mobile station for carrying a cellular communication (i.e., a call) primarily occurs in two instances. The first instance is at call set-up when the subscriber activates the mobile station to initiate a call and the system selects for assignment the traffic channel to carry that new call. The second instance is at call hand-off when the subscriber, while engaged in a call, moves from one cell in the service area to another cell, and the system selects for assignment the traffic channel in the new cell that will continue the handling of the on-going call. In either case, it is important that the traffic channel selected for assignment at call set-up or hand-off be of the highest quality possible.

Conventionally, the selection and assignment by the system of a traffic channel to carry a call is performed by randomly choosing a logical channel from the available (idle) digital traffic channels allocated to the cell currently serving the mobile station. Alternatively, the system maintains a record of historic traffic channel use for each cell (normally in the form of a FIFO queue), and the traffic channel selected to carry the call is the channel allocated to that cell which has not been assigned for mobile station calling use in the longest period of time. While each of these selection methods is successful in assigning a traffic channel in a cell to a mobile station for carrying the call, the selection fails to take into consideration whether the traffic channel is the best quality (i.e., least interfered) channel available to carry the call. The prior art selection methods further fail to take into account concerns over minimizing the interference that may subsequently arise following the assignment of the traffic channel, and minimizing the number of frequencies simultaneously in use. In many instances there may be significant interference (often comprising adjacent channel or perhaps more frequently co-channel interference) on the randomly or queue selected traffic channel, or unacceptable interference may result following assignment due to inefficient simultaneous use of frequencies, and another one of the available idle traffic channels in the cell would have been a more appropriate assignment selection for use in carrying the call.

A need then exists for an improved method for assigning traffic channels to carry a call in response to either a call set-up or hand-off occurrence. This method should give consideration not only to whether the traffic channel is the best quality (i.e., least interfered) channel available to carry the call, but also whether a minimum required number of frequencies are being used as is possible to handle traffic needs.

SUMMARY OF THE INVENTION

Signal strength measurements are made by a signal strength measurement device in each cell base station on those frequencies allocated to that cell which have idle traffic channels. From these measurements, the injected uplink interference (comprising either adjacent channel, co-channel, or other type of interference) on the frequencies for each of the idle traffic channels is determined and reported to the mobile switching center. The reported uplink interference measurements are then adjusted by a predetermined interference penalty if the frequency allocated to the cell presently includes more than a predetermined number of idle traffic channels. The adjusted measurements for all the frequencies are then sorted in relative order of idle traffic channel (adjusted) measured uplink interference from a least (adjusted) interfered frequency to most (adjusted) interfered frequency. The sorted list is then used by the system in selecting, for a base station, a traffic channel from the least (adjusted) interfered frequency for assignment at either call set-up or hand-off.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

There are a plurality of radio frequencies in the cellular band available to cellular telephone system providers for use in communicating with mobile stations. These radio frequencies support both traffic channels and control channels. The traffic channels are used for carrying telephone voice or data conversations. The control channels are used for carrying system operation control signals (commands). Such control signals include page signals, page response signals, location registration signals, traffic channel assignments, maintenance instructions, and cell selection or re-selection instructions.

A cellular service area can cover a large geographic area, and in many instances there will be a need for a large number of cells that often exceeds in number the number of cells provided by dividing the available radio frequencies in such a manner as to handle expected subscriber usage. Accordingly, in order to provide sufficient call handling capacity throughout the service area, the cells are grouped into clusters of cells and the radio frequencies in the cellular band are reused in each of the clusters.

Figure 1:
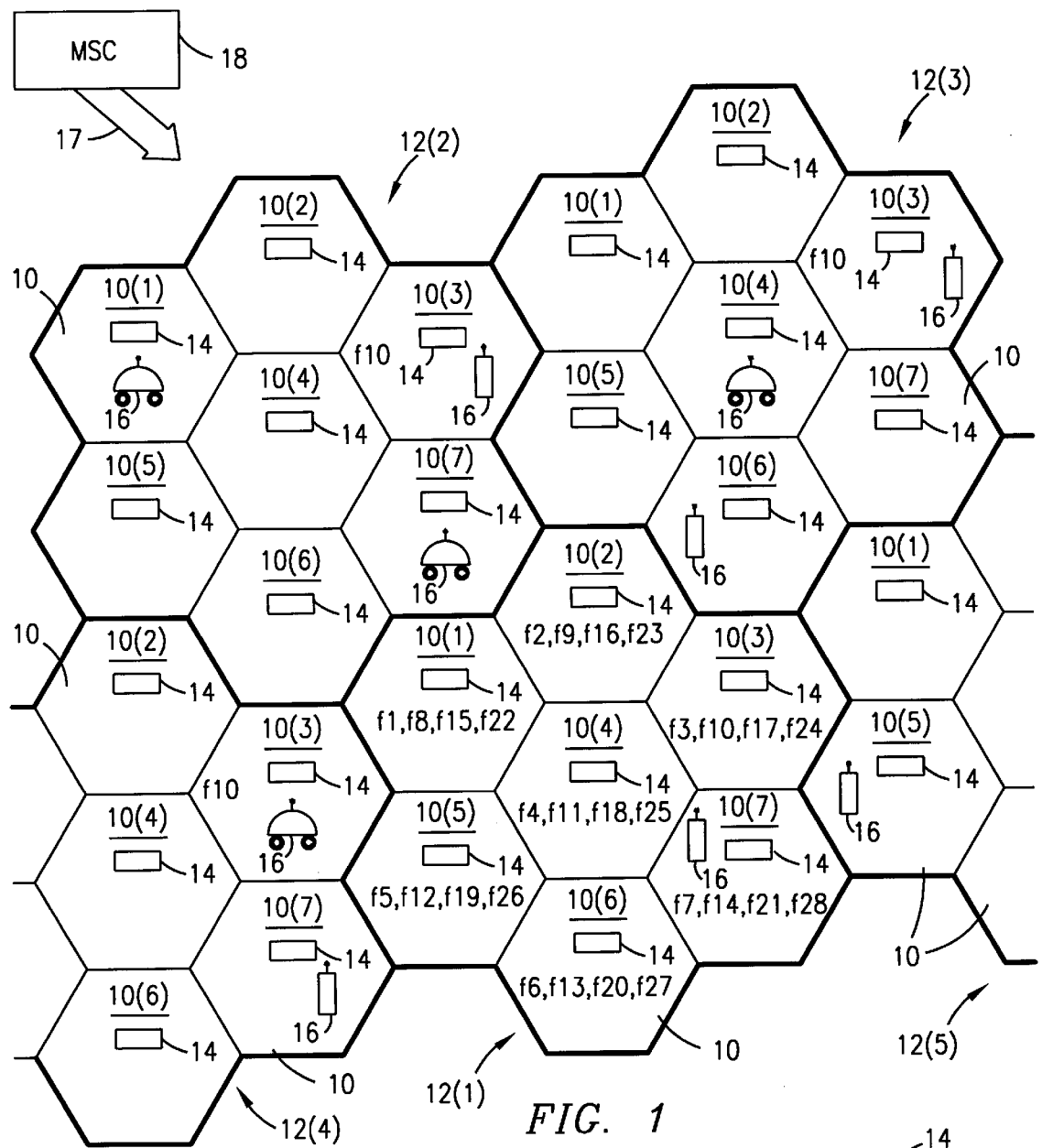
FIG. 1 is an exemplary cell diagram schematically illustrating a frequency reuse cellular telephone system wherein the present invention is implemented.

Reference is now made to FIG. 1 for an illustration of an example of the frequency reuse concept commonly utilized in cellular systems. An arbitrary geographic area (hereinafter "the service area") is divided into a plurality of contiguous cells 10 schematically represented by hexagons. The cells 10 are then grouped into clusters 12 (outlined in bold to ease recognition), which in the present example comprise seven cells 10(1)–10(7) in each cluster. Assume for this example that there are a total of twenty-eight frequencies fn (wherein n=1 to 28) available in the cellular band. It will of course be understood that each frequency actually comprises a paired uplink and downlink frequency. The frequencies f1–f28 are divided equally amongst the cells 10(1)–10(7) to provide four frequencies per cell. Thus, each of the cells 10(1) in the service area is allocated frequencies f1, f8, f15 and f22 for carrying its traffic and control channels. Similar assignments are made for each of the remaining cells 10, with the frequencies also being reused across each of the included clusters 12. The complete allocation of the frequencies f1–f28 to the cells 10(1)–10(7) in each cluster 12 in accordance with this example of cellular frequency reuse is illustrated in detail in FIG. 1 with respect to cluster 12(1).

It is noted in this frequency reuse scheme that in no instance have adjacent cells been allocated use of the same frequency. Reuse of an identical frequency in the service area at a minimum requires a separation of at least one cell 10 along with a regulation of broadcast power from each cell to constrain radio propagation substantially within the cell area. Furthermore, it is noted that in no instance does any one cell 10 utilize adjacent frequencies in the cellular band. Adjacent frequencies should exist no closer than one cell 10 away from each other. By arranging the cells 10 in clusters 12 as shown in the figure, regulating broadcast power of communications within the cell, and further by allocating frequencies in the fashion described above and shown in the figure, the likelihood of interference is minimized while simultaneously providing effective and efficient cellular communications services across a very large service area.

In spite of the precautions taken to avoid interference, it is known that interference does occur in cellular systems like that previously described. One aspect of this interference originates from communications occurring in the cells of other clusters 12 on the same frequency (i.e., co-channel interference). To understand this phenomena, assume the existence of concurrent voice communications using frequency f10 (and perhaps individual time slots therein) in each of the cells 10(3) in each of the clusters 12(2), 12(3) and 12(4) as shown in FIG. 1. In spite of any imposed broadcast power limitations, a certain amount of the radio frequency energy of those voice communications propagates beyond the respective cell boundaries and is injected as interference into frequency f10 in cell 10(3) of cluster 12(1).

Another aspect of this injected interference originates from communications occurring in other cells on adjacent frequencies (i.e., adjacent channel interference). To understand this phenomena, assume the existence of concurrent voice communications on frequency f8 in cell 10(1) and frequency f9 in cell 10(2) and perhaps individual time slots therein, of cluster 12(1) as shown in FIG. 1. In spite of any regulations on broadcast power and the presence of guard bands around each of the frequencies, improper transceiver broadcasts around one frequency (for example, f8) may be injected as interference into the adjacent frequency f9. It should be recognized that adjacent channel interference is not nearly as common an occurrence as co-channel interference in well regulated and stable communication systems.

Because this injected interference may adversely affect cellular voice communications over a given frequency, it would be unwise for the system to act during certain times of high interference by assigning that given frequency (or channel therein) to a mobile station at either call set-up or hand-off to carry a cellular voice communication. Unfortunately, the prior art random or queued channel selection methods fail to obtain knowledge of and consider such injected interference and its adverse effects in selecting and assigning a voice channel (comprising a time slot within the frequency) during either call set-up or hand-off. There would be a great advantage to system operation if voice channel quality measurements could be made and evaluated prior to system voice channel selection and assignment.

The concerns over co-channel interference extend down to the time slot level within each frequency. It is recognized that at times of light or moderate loading, not every frequency (or every time slot therein) is needed for assignment to handle voice communications. Situations arise then where not every one of the plural time slots associated with a single frequency are used. Some injected co-channel interference arises from this use. At the same time, none of the plural time slots in another frequency may be used. No injected co-channel interference arises from this use. When a traffic channel assignment is then subsequently made, the prior art random or queued channel selection methods fail to obtain knowledge of and consider time slot usage between the allocated frequencies in a cell before selecting and assigning a voice channel (comprising a time slot within the frequency) during either call set-up or hand-off. There would be a great advantage to system operation if efforts were made to minimize the number of frequencies actively being used to carry communications prior in connection with system voice channel selection and assignment.

Each of the cells 10 in a cellular system such as that illustrated in FIG. 1 includes at least one base station (BS) 14 configured to facilitate radio frequency communications with mobile stations 16 roaming throughout the service area. The base stations 14 are illustrated as being located at or near the center of each of the cells 10. However, depending on geography and other known factors, the base stations 14 may instead be located at or near the periphery of, or otherwise away from the centers of, each of the cells 10. In such instances, the base stations 14 may broadcast and communicate with mobile stations 16 located within the cells 10 using directional rather than omni-directional antennas. The base stations 14 are connected by communications links (illustrated schematically by arrow 17) to at least one mobile switching center (MSC) 18 operating to control the operation of the system for providing cellular communications with the mobile stations 14.

Figure 2:
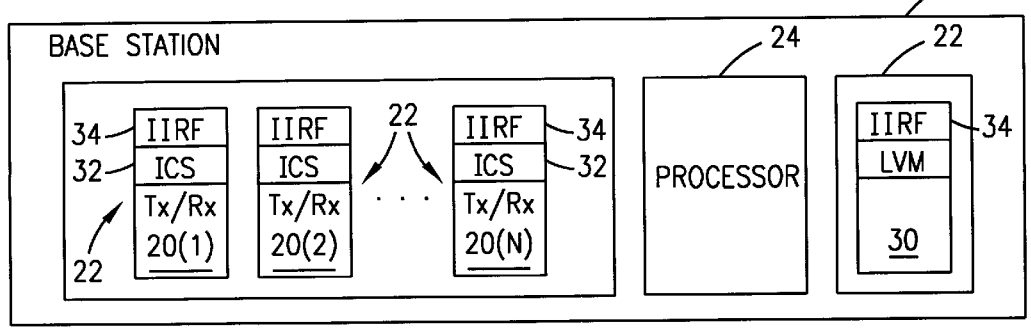
FIG. 2 is a simplified block diagram of a base station in accordance with the present invention for use in the frequency reuse cellular telephone system of FIG. 1.

Reference is now additionally made to FIG. 2 wherein there is shown is a simplified block diagram of a base station 14 used in the system of FIG. 1 in accordance with the present invention. The base station 14 includes a plurality of transceivers (Tx/Rx) 20(1) through 20 (N), wherein N is the number of frequencies allocated to the cell 10 served by the base station. In the exemplary system shown in FIG. 1, N=4 wherein seven cells 10 are included in each cluster 12 and a total of twenty-eight available radio frequencies in the cellular band. The transceivers 20 have a configuration known in the art that includes a transmitter and a receiver tuned to operate on one of the frequencies allocated to the base station 14 for its traffic and/or control channels. Each allocated frequency provides a plurality of digital TDMA channels for mobile station use.

The base station 14 also includes a signal strength measurement device 22 that is used in one mode known in the art during hand-off to measure the signal strength of communications on the voice frequencies assigned to and used by other cells. In accordance with the present invention, the operation of the signal strength measurement device 22 of each base station 14 is controlled in an additional operating mode by received mobile switching center commands and/or the base station programming to measure the signal strength of communications on each of the frequencies supporting idle traffic channels allocated to the base station. These measurements are made at selected times or are made periodically in accordance with system specifications. The results of the measurements provide an indication of the amount of injected uplink interference caused by same or adjacent channel communications occurring simultaneously within the system, or caused by any other interference source. The idle traffic channel signal strength measurements comprising the measured uplink interference (on either a frequency or time slot basis) are reported by the signal strength measurement device 22 of the base station 14 to the mobile switching center 18 (perhaps along with the hand-off traffic channel signal strength measurements made on the frequencies/channels allocated to other cells) and considered in connection with the process for selecting and assigning a voice channel at either call set-up or hand-off. Alternatively, a processor 24 within the base station 14 may receive the measured uplink interference (on either a frequency or time slot basis) for processing to select and assign a voice channel at either call set-up or hand-off.

In one embodiment of the present invention, the signal strength measurement device 22 comprises a locating verification module (LVM) 30 including a receiver and frequency synthesizer for selectively tuning to any one of the frequencies available in the cellular band. As each of the frequencies allocated to a cell 12 is subdivided into a plurality of time slots comprising the traffic channels, the locating verification module 30 further includes a circuit (not explicitly shown) for synchronizing operation of the module to the TDMA communications protocol being implemented by the system so that the signal strength measurements on a selected frequency may be made during each of the plurality of included time slots therein. This would include not only the frequencies/time slots allocated to and used by other cells, but also the frequencies/time slots allocated to and used by the cell served by the base station 14. The signal strength measurements made by the locating verification module 30 are then filtered by an infinite impulse response filter (IIRF) 34 before being subsequently processed in accordance with the present invention. The filtering removes fast changes in the measured interference levels to provide a stable estimate for output and subsequent processing. With respect to the implementation of the present invention, the locating verification module 30 makes and reports measurements made on the frequencies/time slots associated with idle traffic channels in order to supply uplink interference measurement data.

In another embodiment of the present invention, the signal strength measurement device 22 comprises an idle channel supervision (ICS) functionality 32 associated with each transceiver 20. The idle channel supervision functionality 32 advantageously uses the receiver portion of the transceiver 20 to make the uplink signal strength measurements. This idle channel supervision functionality 32 may include a circuit (not explicitly shown) for synchronizing measurement operation to the TDMA communications protocol being implemented by the system so that the signal strength measurements on a selected frequency may be made during each of the plurality of included time slots therein. The selected frequencies upon which measurements are made comprise the frequencies/time slots allocated to and used by the cell served by the base station 14. With respect to the implementation of the present invention, the locating verification module 30 makes and reports measurements made on the frequencies/time slots associated with idle traffic channels in order to supply uplink interference measurement data. The signal strength measurements made by the idle channel supervision functionality 32 are then filtered by an infinite impulse response filter (IIRF) 34 before being subsequently processed in accordance with the present invention. The filtering removes fast changes in the measured interference levels to provide a stable estimate for output and subsequent processing.

In one embodiment of the present invention, the base stations report signal strength measurements on a per idle time slot basis to either the processor 24 or the mobile switching center for processing. For this embodiment, the processing means comprising either the processor 24 or the mobile switching center may make intelligent time slot specific channel assignments with respect to minimizing interference concerns (for example, by choosing a least interfered time slot within a selected frequency). In another embodiment, the base stations process the signal strength measurements made on a per idle time slot basis to obtain an interference measure for the frequency (i.e., the carrier). It is this carrier based interference measurement that is reported to the processing means comprising either the processor 24 or the mobile switching center. For this embodiment, the processor 24 or mobile switching center does not possess per time slot interference information from which to make an intelligent assignment selection. Instead, the processor 24 or mobile switching center makes the decision as to which time slot channel to assign based on a random selection among the idle time slots in the least interfered carrier. More information on the processes implemented in accordance with the present invention is provided herein.

Figure 3A:
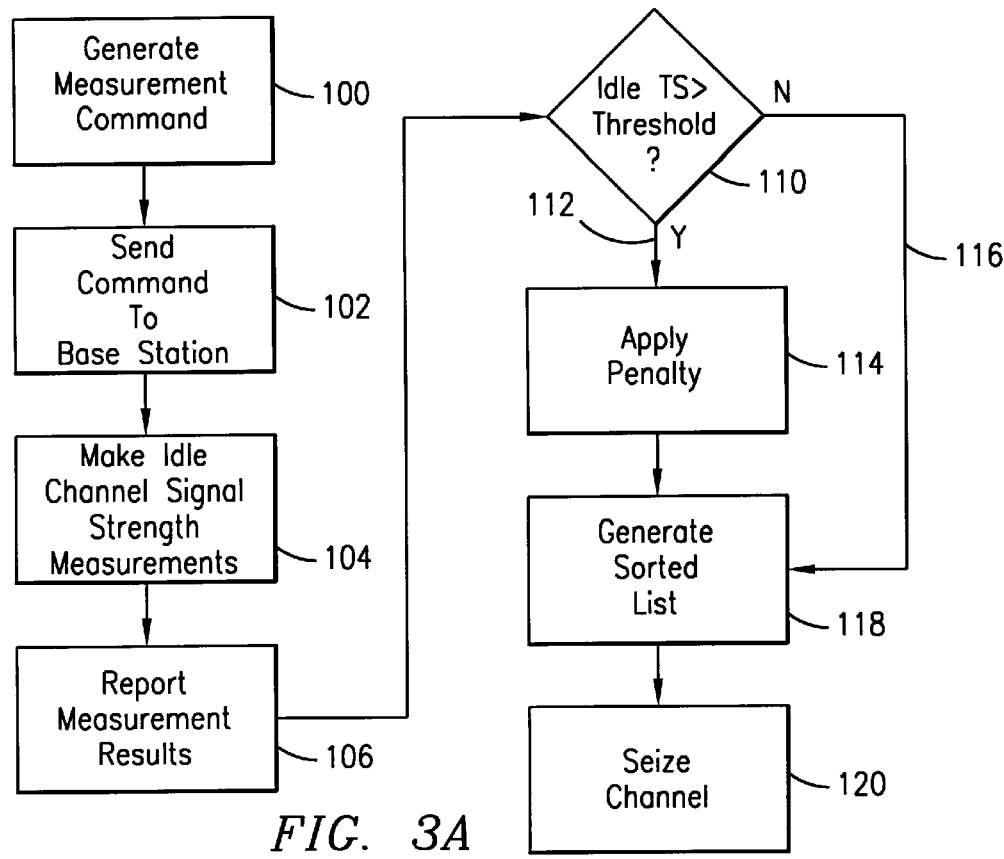
FIGS. 3A and 3B are flow diagrams illustrating alternative methods of operation for the channel selection process of the present invention.

Reference is now made to FIG. 3A wherein there is shown a flow diagram illustrating one manner of operation of the channel selection process of the present invention. In step 100, at a designated point in time the mobile switching center of the cellular telephone system generates a message commanding certain ones of the base stations to make idle traffic channel signal strength measurements. This command message is sent to the designated base stations in step 102. At each of the receiving base stations, the command message is implemented in step 104 by configuring the signal strength measurement device of the base station to tune to the base station's own allocated frequencies and make signal strength measurements (i.e., uplink interference measurements) on the frequencies with idle traffic channels that have been allocated to the cell served by the particular measuring base station. If possible, these measurements are made on a per idle time slot basis. It should be understood that this is an operating mode in addition to the conventional operating mode of making measurements on neighboring cell voice channels in response to a hand-off request and the determination of a target cell.

The results of the uplink interference (signal strength) measurements on the frequencies with idle traffic channels are reported by the signal strength measurement device back to the mobile switching center in step 106. Again, alternatively, the measurements are reported to the processor 24 of the base station. This report also may be made upon receipt of a request from the mobile switching center. The report comprises either the measurements on a per idle time slot basis, or the accumulated measurement for a frequency (carrier). If the report is time slot specific, appropriate accumulation processing is performed at the processing means comprising either the processor of the base station or the mobile switching center to make a per frequency interference calculation. A determination is then made in step 110 as to the relative loading on each frequency having an uplink interference measurement reported in step 106. This loading determination evaluates, in general, the number of idle time slots within each measured frequency. If the number of idle time slots exceeds a predetermined threshold number (see, path 112), an interference penalty is assessed against the measured uplink interference for that frequency/carrier (step 114). If the threshold number is not exceeded (see, path 116), no penalty is applied. Although not specifically illustrated, it is understood that the process of steps 110 and 114 is performed, as needed, with respect to each of the frequencies having a step 106 reported uplink interference measurement. Following the adjustment (if any) applied in step 114 to the reported uplink interference measurements, the (adjusted) measurements in step 118 are processed to generate a sorted list of measured frequencies having idle traffic channels that are candidates for selection and assignment at either call set-up or hand-off. The generated list is sorted from the reported measurements in relative order of idle traffic channel measured (adjusted) uplink interference (e.g., from the least interfered (adjusted) frequency to the most interfered (adjusted) frequency). At an instance of traffic channel seizure (step 120), an idle one of the traffic channels within the least interfered (adjusted) frequency on the re-sorted list is randomly selected and assigned for either call set-up or hand-off. Alternatively, if individual time slot interference information is available, the least interfered time slot within that least interfered (adjusted) frequency is selected.

Figure 3B:
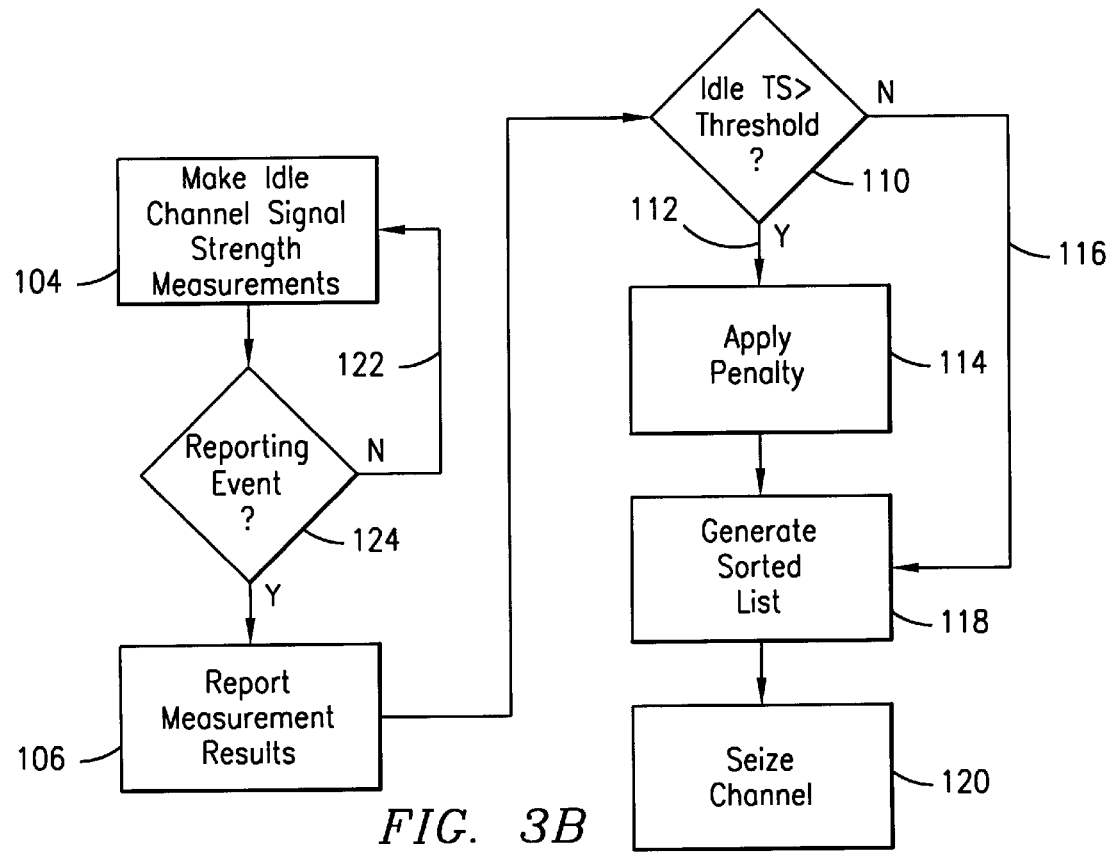

Referring now to FIG. 3B, there is shown a flow diagram illustrating an alternative method of operation in accordance with the present invention wherein loop 122 and step 104 concern the programming of the base station to periodically measure signal strength on frequencies having idle voice channels that have been assigned to the cell served by the particular measuring base station. If possible, these measurements are made on a per idle time slot basis. At step 124 in loop 122, the base station programming tests for the occurrence of a reporting event. By this it is meant some cellular system event in response to which the measurements are to be reported to the mobile switching center or the base station processor. One such event comprises receipt of a command from the mobile switching center specifying the transmittal of the latest measurements. Another such event comprises receipt of a command from the mobile switching center directing the signal strength measuring device to make measurement on the traffic channels of other neighboring cells in preparation for hand-off and the selection of a target cell. In that case, the measurements relating to the own traffic channels are appended to the message reporting on the measurements made of the traffic channels for the neighboring cells. Yet another such event comprises a time out occurrence, thus effectuating periodic reporting of the traffic channel signal strength measurement information. Still further, the reporting event comprises a change in measured interference greater than a certain hysteresis value.

Once the reporting event occurs, the measurements are reported in step 106 to the mobile switching center. Again, alternatively, this measurement report may be made to the processor 24 of the base station. The report comprises either the measurements on a per idle time slot basis, or the accumulated measurement for a frequency (carrier). If the report is time slot specific, appropriate accumulation processing is performed at the processor of the base station or mobile switching center to make a per frequency interference calculation. Preferably, no report 106 is made if the most recent previous report was sent within a predetermined time threshold. A determination is then made in step 110 as to the relative loading on each frequency having an uplink interference measurement reported in step 106. This loading determination evaluates, in general, the number of idle time slots within each frequency. If the number of idle time slots exceeds a predetermined threshold number (see, path 112), an interference penalty is assessed against the measured uplink interference for that frequency (step 114). If the threshold number is not exceeded (see, path 116), no penalty is applied. Although not specifically illustrated, it is understood that the process of steps 110 and 114 is performed, as needed, with respect to each of the frequencies having a step 106 reported uplink interference measurement. Following the adjustment (if any) applied in step 114 to the reported uplink interference measurements, the (adjusted) measurements in step 118 are processed to generate a sorted list of frequencies having idle traffic channels that are candidates for selection and assignment at either call set-up or hand-off. The generated list is sorted from the reported measurements in relative order of idle traffic channel measured (adjusted) uplink interference (e.g., from the least interfered (adjusted) frequency to the most interfered (adjusted) frequency). At an instance of traffic channel seizure (step 120), an idle one of the traffic channels within the least interfered (adjusted) frequency on the re-sorted list is randomly selected and assigned for either call set-up or hand-off. Alternatively, if individual time slot interference information is available, the least interfered time slot within that least interfered (adjusted) frequency is selected.

The particular penalty applied in step 114 against the previously made and sorted uplink interference measurements when the number of idle traffic channels exceeds the threshold may differ depending on the precise number of idle traffic channels that are present. For example, in a commonly implemented TDMA communications system, each frequency includes three time slots. The predetermined threshold in such a situation may require that two or more idle time slots be found with respect to a given frequency before applying the penalty. Then, if two idle time slots are found, the penalty that is applied to the uplink interference measurement is X dB. If, on the other hand, three idle time slots are found, the penalty that is applied to the uplink interference measurement is X+Y dB. A similar penalty scheme is implemented with respect to the eight time slots (resulting in seven penalty levels) associated with a Global System for Mobile (GSM) communications system. In any case, the object of applying the penalty to make the associated frequency having such a large number of idle time slots less attractive when the seizure of step 120 is performed. Conversely, for the frequency having only a single idle time slot, no penalty is applied in order to continue making its lone idle time slot an attractive candidate for seizure.

With respect to the sorted (step 118) list, all frequencies allocated to a cell having idle time slots may be included on a single, comprehensive list. Alternatively, multiple lists may be generated in step 118 to account, for example, for differences that may need to be considered when the seizure of step 120 is performed. For example, it is known that the cellular frequency band includes both a basic band and an extended band. It is possible for separate step 118 sorted lists to be generated, one list for the frequencies having idle traffic channels in the basic band, and one list for the frequencies having idle traffic channels in the extended band. In another example, one list may be provided for data calls only, one list for voice calls only, and one list for either data calls or voice calls. At the time of seizure (step 120), an appropriate one (or perhaps more than one) of the re-sorted lists is then evaluated in connection with randomly or intelligently choosing an idle traffic channel for call set-up or hand-off assignment.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A cellular telephone system, comprising:
   a base station allocated use of a plurality of frequencies, each frequency including a plurality of time slot traffic channels, comprising:
   a signal strength measuring device selectively tunable to make signal strength measurements on the frequencies allocated to the base station having idle time slot traffic channels and obtain uplink interference measurements on those measured frequencies; and
   processing means connected to receive the uplink interference measurements, the processing means operating to:
   apply an interference penalty against the received uplink interference measurements if the measured frequency includes more than a threshold number of idle time slot traffic channels;
   sort the measured frequencies by their uplink interference measurements adjusted by any applied interference penalties from a least uplink interfered frequency to a most uplink interfered frequency; and
   select for assignment by the base station at call set-up or hand-off one of the idle time slot traffic channels included within the least uplink interfered frequency.

2. The system as in claim 1 wherein the signal strength measuring device comprises a base station locating verification module.

3. The system as in claim 1 wherein the signal strength measuring device comprises a base station idle channel supervision functionality provided by a base station transceiver.

4. The system as in claim 1 wherein the signal strength measuring device makes signal strength measurements for each idle time slot.

5. The system as in claim 1 wherein the processing means sorting operation sorts the measured frequencies by their uplink interference measurements adjusted by any applied interference penalties into plural lists, each list ordered from a least uplink interfered frequency to a most uplink interfered frequency.

6. The system as in claim 5 wherein the processing means selecting operation selects from a certain one or ones of the plural lists for assignment at call set-up or hand-off one of the idle time slot traffic channels included within the least uplink interfered frequency contained on that certain list.

7. The system as in claim 1 wherein the processing means applying operation applies an increasing interference penalty against the received uplink interference measurements corresponding to when an increasing number of idle time slot traffic channels are included within the frequency.

8. The system as in claim 1 wherein the processing means comprises a mobile switching center connected to the base station.

9. A method for use in a cellular telephone system for assigning traffic channels, comprising the steps of:
   making signal strength measurements on frequencies allocated to a base station, wherein each frequency includes a plurality of time slot traffic channels, the measurement made on those frequencies having idle time slot traffic channels to obtain uplink interference measurements;
   applying an interference penalty against the made uplink interference measurements if the measured frequency includes more than a threshold number of idle time slot traffic channels;
   sorting the measured frequencies by their uplink interference measurements adjusted by any applied interference penalties from a least uplink interfered frequency to a most uplink interfered frequency; and selecting for assignment by the base station at call set-up or hand-off one of the idle time slot traffic channels included within the least uplink interfered frequency.

10. The method as in claim 9 wherein the step of making signal strength measurements comprises the step of making signal strength measurements for each idle time slot.

11. The method as in claim 9 wherein the step of sorting comprises the step of sorting the measured frequencies by their uplink interference measurements adjusted by any applied interference penalties into plural lists, each list ordered from a least uplink interfered frequency to a most uplink interfered frequency.

12. The method as in claim 11 wherein the step of selecting comprises the step of selecting from a certain one or ones of the plural lists for assignment at call set-up or hand-off one of the idle time slot traffic channels included within the least uplink interfered frequency contained on that certain list.

13. The method as in claim 9 wherein step of applying comprises the step of applying an increasing interference penalty against the received uplink interference measurements corresponding to when an increasing number of idle time slot traffic channels are included within the frequency.

14. The method as in claim 9 wherein the step of selecting comprises the step of randomly selecting an idle time slot traffic channel included within the least uplink interfered frequency.

15. The method as in claim 9 wherein the step of selecting comprises the step of selecting an idle time slot traffic channel having a lowest interference included within the least uplink interfered frequency.

16. A cellular telephone system having a plurality of frequencies available for carrying cellular communications, each frequency including a plurality of time slot traffic channels, comprising:

a plurality of base stations distributed across a service area, each base station being allocated to use a subset of the plurality of frequencies wherein each base station includes:

a signal strength measuring device selectively tunable for making signal strength measurements on any of the plurality of frequencies in the system; and processing means:

connected to receive a report from a given base station of measurements made by the signal strength measuring device on selected ones of the subset of frequencies allocated to that given base station which include idle traffic channels, the measured signal strengths indicative of uplink interference; and operating to process uplink interference signal strength measurements for the selected frequencies and select for assignment by the given base station an idle time slot traffic channel on as little an interfered one of selected frequencies as possible while simultaneously using as few of the frequencies allocated to that given base station as possible by giving selection preference to an idle time slot traffic channel on the as little interfered one of the selected frequencies which currently has the fewest number of idle time slots.

17. The system of claim 16 wherein the signal strength measuring device comprises a locating verification module.

18. The system of claim 16 wherein the signal strength measuring device comprises an idle channel supervision functionality provided by a base station transceiver.

19. The system as in claim 16 wherein the signal strength measuring device makes signal strength measurements for each idle time slot.

20. The system as in claim 16 wherein the processing means operates to process and select by:

applying an interference penalty against the received uplink interference measurements if the measured frequency includes more than a threshold number of idle time slot traffic channels;

sorting the measured frequencies by their uplink interference measurements adjusted by any applied interference penalties from a least uplink interfered frequency to a most uplink interfered frequency; and selecting for assignment by the base station at call set-up or hand-off one of the idle time slot traffic channels included within the least uplink interfered frequency.

21. The system as in claim 20 wherein the processing means performs the sorting operation to sort the measured frequencies by their uplink interference measurements adjusted by any applied interference penalties into plural lists, each list ordered from a least uplink interfered frequency to a most uplink interfered frequency.

22. The system as in claim 21 wherein processing means performs the selecting operation to select from a certain one or ones of the plural lists for assignment at call set-up or hand-off one of the idle time slot traffic channels included within the least uplink interfered frequency contained on that certain list.

23. The system as in claim 20 wherein the processing means performs the applying operation to apply an increasing interference penalty against the received uplink interference measurements corresponding to when an increasing number of idle time slot traffic channels are included within the frequency.

24. The system as in claim 16 wherein processing means comprises a mobile switching center.

25. A method for use in a cellular telephone system for assigning traffic channels, comprising the steps of:

making signal strength measurements on frequencies allocated to a base station, wherein each frequency includes a plurality of time slot traffic channels, the measurement made on those frequencies having idle time slot traffic channels to obtain uplink interference measurements;

making a report by a given base station of measurements made on selected ones of the plurality of frequencies allocated to that given base station which include idle traffic channels, the measured signal strengths indicative of uplink interference; and processing the reported uplink interference signal strength measurements for the selected frequencies to select for assignment by the given base station an idle time slot traffic channel on as little an interfered one of selected frequencies as possible while simultaneously using as few of the frequencies allocated to that given base station as possible by giving selection preference to an idle time slot traffic channel on the as little interfered on to the selected frequencies which currently has the fewest number of idle time slots.

26. The method as in claim 25 wherein the step of making signal strength measurements comprises the step of making signal strength measurements for each idle time slot.

27. The method as in claim 25 wherein the step of processing comprises the steps of:

applying an interference penalty against the received uplink interference measurements if the measured frequency includes more than a threshold number of idle time slot traffic channels;

sorting the measured frequencies by their uplink interference measurements adjusted by any applied interference penalties from a least uplink interfered frequency to a most uplink interfered frequency; and selecting for assignment by the base station at call set-up or hand-off one of the idle time slot traffic channels included within the least uplink interfered frequency.

28. The method as in claim 27 wherein the step of sorting comprises the step of sorting the measured frequencies by their uplink interference measurements adjusted by any applied interference penalties into plural lists, each list ordered from a least uplink interfered frequency to a most uplink interfered frequency.

29. The method as in claim 28 wherein the step of selecting comprises the step of selecting from a certain one or ones of the plural lists for assignment at call set-up or hand-off one of the idle time slot traffic channels included within the least uplink interfered frequency contained on that certain list.

30. The method as in claim 27 wherein step of applying comprises the step of applying an increasing interference penalty against the received uplink interference measurements corresponding to when an increasing number of idle time slot traffic channels are included within the frequency.

31. The method as in claim 27 wherein the step of selecting comprises the step of randomly selecting an idle time slot traffic channel included within the least uplink interfered frequency.

32. The method as in claim 27 wherein the step of selecting comprises the step of selecting an idle time slot traffic channel having a lowest interference included within the least uplink interfered frequency.

* * * * *

UNITED STATES PATENT AND TRADEMARK OFFICE
CERTIFICATE OF CORRECTION

PATENT NO. : 5,963,865  
DATED : October 5, 1999  
INVENTOR(S) : Desgagné et al.

Page 1 of 1

It is certified that error appears in the above-identified patent and that said Letters Patent is hereby corrected as shown below:

<u>Column 12,</u>  
Line 54-55, replace "on to" with -- one of --

Signed and Sealed this

Second Day of April, 2002

Attest:

JAMES E. ROGAN  
*Director of the United States Patent and Trademark Office*

*Attesting Officer*